United States Patent
Sato

(10) Patent No.: US 6,525,269 B2
(45) Date of Patent: Feb. 25, 2003

(54) SOUNDPROOF GROMMET FOR WIRING HARNESS

(75) Inventor: Masayuki Sato, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/197,556

(22) Filed: Jul. 18, 2002

(65) Prior Publication Data

US 2003/0015339 A1 Jan. 23, 2003

(30) Foreign Application Priority Data

Jul. 18, 2001 (JP) .......................................... 2001-217992

(51) Int. Cl.[7] ................................................ H02G 3/18
(52) U.S. Cl. .............................. 174/65 G; 174/152 G; 174/153 G; 16/2.1
(58) Field of Search ......................... 174/65 G, 152 G, 174/153 G, 135, 151, 65 R; 16/2.1, 2.2; 248/56

(56) References Cited

U.S. PATENT DOCUMENTS 4,299,363 A * 11/1981 Datschefski ................. 248/56
5,071,143 A * 12/1991 Byerly et al. ......... 174/65 G X
6,353,185 B1 * 3/2002 Sakata ....................... 174/65 G
6,444,908 B1 * 9/2002 Krall ......................... 174/65 G
6,465,740 B2 * 10/2002 Kondoh et al. ......... 174/152 G

FOREIGN PATENT DOCUMENTS

JP    2000-104865    4/2000

* cited by examiner

Primary Examiner—Anthony Dinkins
Assistant Examiner—Dhiru R Patel
(74) Attorney, Agent, or Firm—Oblon, Spivak, McClelland, Maier & Neustadt, P.C.

(57) ABSTRACT

A soundproof grommet is provided with a base body including an engaging groove provided on an outer surface thereof, a conical wall integrally connected therewith and a main tube portion integrally projected from the conical wall, a soundproof envelope integrally connected with the base body, and one or more extra tube portions penetrating the conical wall and the soundproof envelope in an integral manner. The soundproof envelope is further provided with a wire supporting portion. A wiring harness is inserted to and in close contact with the main tube portion and the wire supporting portion so that the base body and the soundproof envelope form an airtight chamber.

2 Claims, 4 Drawing Sheets

SOUNDPROOF GROMMET FOR WIRING HARNESS

BACKGROUND OF THE INVENTION

1. Field of the Invention

The present invention relates to a soundproof grommet for installing a wiring harness so as to pass through a panel of an automobile.

2. Description of the Related Art

A proposed grommet is provided with a base body including an engaging groove provided on an outer surface thereof, and a waterproof tube portion integrally projected therefrom. The waterproof tube portion receives and closely contacts with a wiring harness inserted thereto so as to be waterproof.

The grommet includes a soundproof envelope which is integrally connected with the waterproof tube portion. The soundproof envelope is turned-over to the base body and is in close contact therewith. Thereby an airtight chamber is formed between the base body and the sound proof envelope so as to be soundproof.

The grommet further includes one or more extra tube portions penetrating the base body.

An art related to the proposed grommet is disclosed in Japanese Patent Application Laid-open No. 2000-104865.

SUMMARY OF THE INVENTION

According to the proposed grommet, one or more extra cables may pass through the extra tube portions respectively. In such a case, the soundproof envelope is obstructed by the passing cables so as not to be in close contact with the base body. Therefore sound insulation is reduced.

The present invention is accomplished in view of the above problem and intends to provide a soundproof grommet with excellent sound insulation.

According to a first aspect of the present invention, a soundproof grommet is provided with a base body including an engaging groove provided on an outer surface thereof, a conical wall integrally connected therewith and a main tube portion integrally projected from the conical wall; a soundproof envelope integrally connected with the base body, having a wire supporting portion; and one or more extra tube portions penetrating the conical wall and the soundproof envelope in an integral manner. The main tube portion and the wire supporting portion receive and closely contact with a wiring harness inserted thereto so that the base body and the soundproof envelope form an airtight chamber.

The extra tube portions penetrate both the conical wall of the base body and the soundproof envelope. Thereby the soundproof envelope is not obstructed by the insertion of extra cables. The chamber formed by the base body and the soundproof envelope is always kept airtight so as to assure excellent sound insulation.

According to a second aspect of the present invention, each of the extra tube portions of the grommet described above is further provided with a pair of soundproof walls integrally connected with the conical wall and the soundproof envelope.

In a case where recesses penetrating the base body through the soundproof envelope are provided adjacent to the extra tube portions respectively, the airtightness of the airtight chamber is assured by the soundproof walls instead of the penetrated base body. Thereby excellent sound insulation is assured.

DETAILED DESCRIPTION OF THE PREFERRED EMBODIMENT

An embodiment of the present invention is described hereinafter with reference to FIGS. 1–4.

Figure 1:
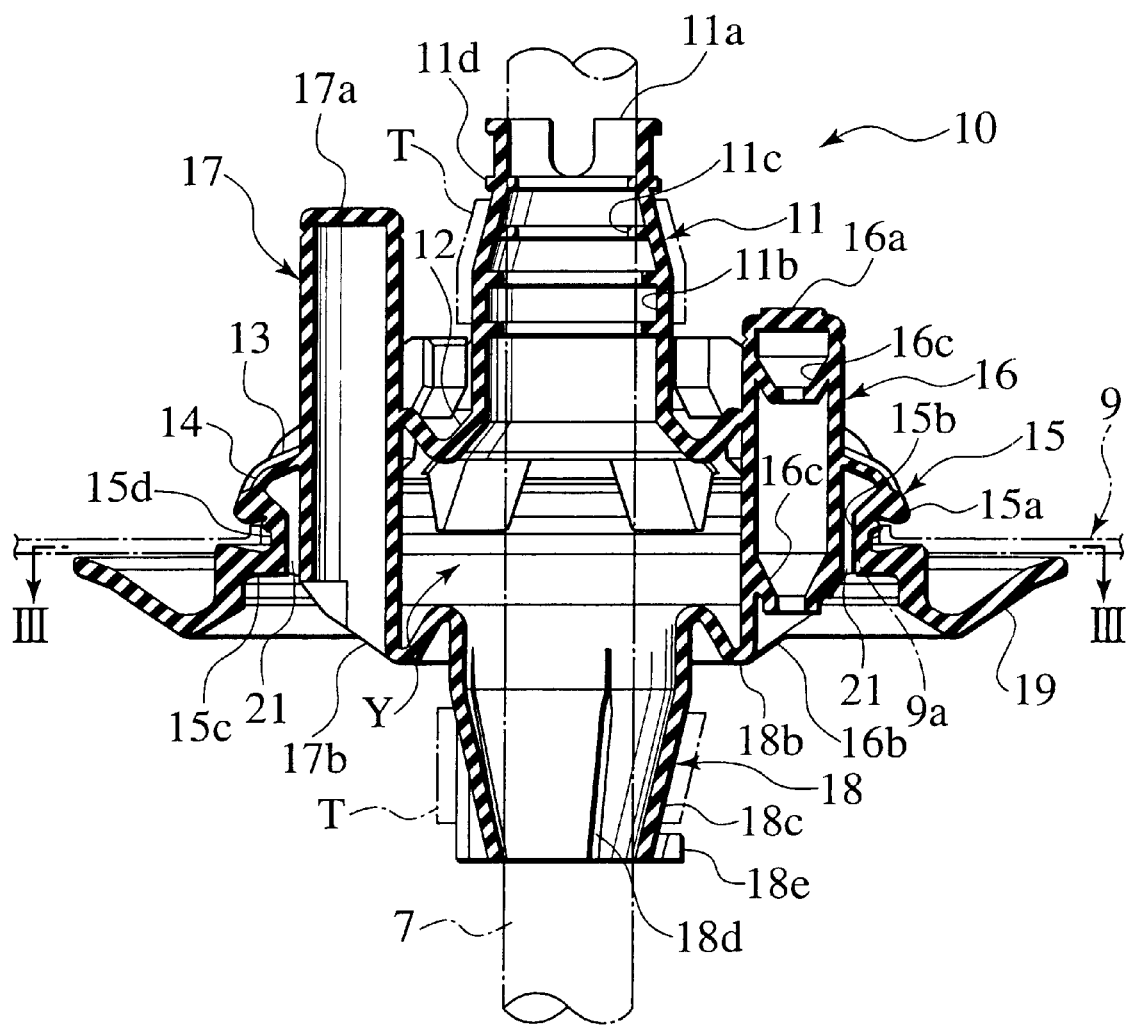
FIG. 1 is a longitudinal sectional view of a soundproof grommet according to an embodiment of the present invention taken along a line I—I of FIG. 2.
Figure 4:
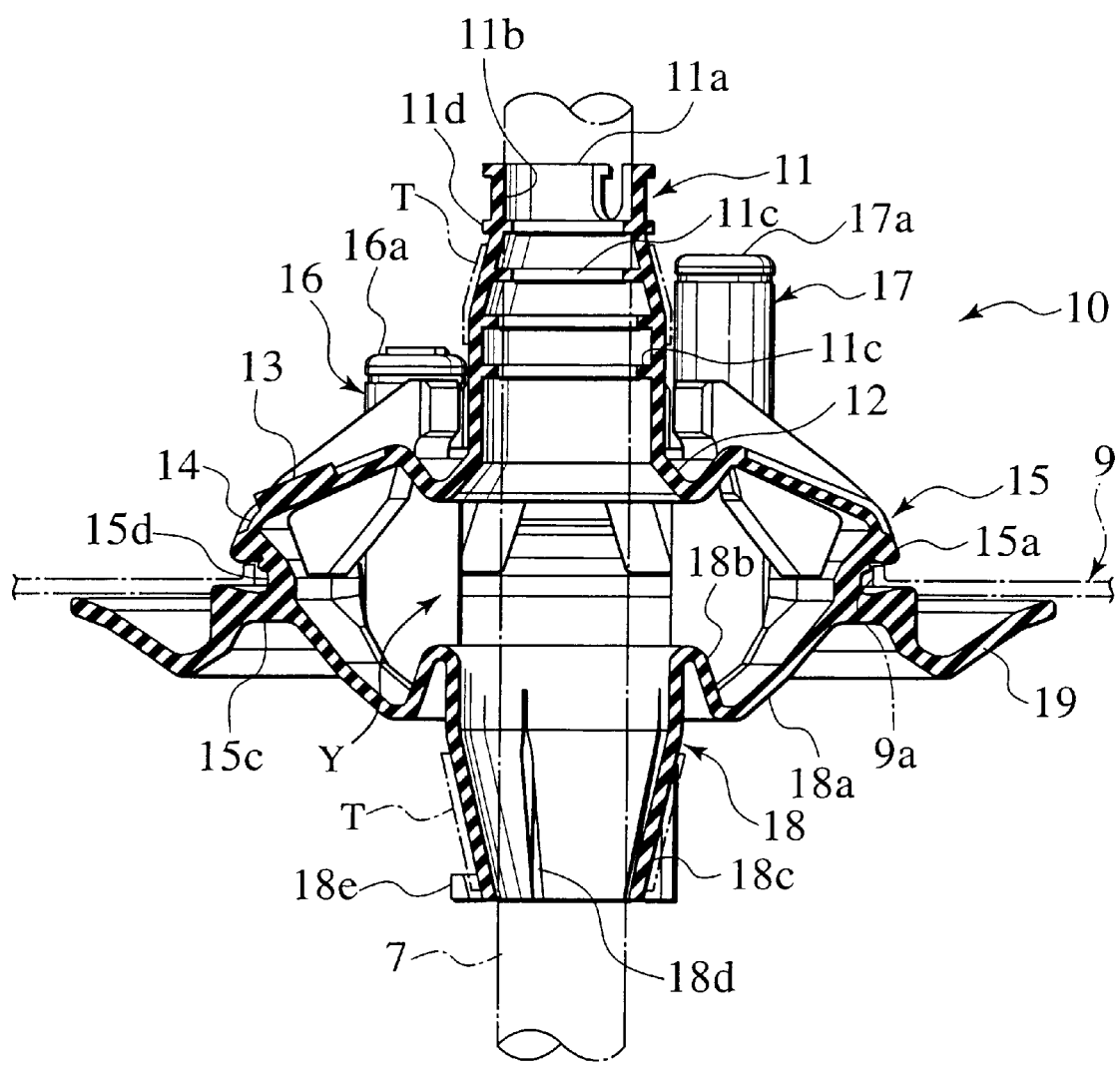
FIG. 4 is a longitudinal sectional view of the soundproof grommet taken along a line IV—IV of FIG. 2.

A soundproof grommet 10 is provided with a main tube portion 11 to which a wiring harness 7 is inserted, a conical wall 13 integrally connected with the main tube portion 11 via a connection portion 12 in a turn-over manner, a base body 15 connected with the conical wall 13 via a connection portion 14, a soundproof envelope 18 integrally connected with an inner periphery of a thin-walled portion 15c of the base body 15 and extra tube portions 16 and 17 penetrating the conical wall 13 and the soundproof envelope 18 in an integral manner as shown in FIGS. 1 and 4. The soundproof envelope 18 is extended to a center thereof and is projected in the opposite direction of the main tube portion 11 so as to support the wiring harness 7. The base body 15 further comprises an engaging groove 15d on the outer surface 15a thereof and a flange 19 integrally connected with the outer surface 15a. The engaging groove 15d is engaged with a mounting hole of a panel 9 of an automobile and then the flange 19 is in close contact with the panel 9. The whole body is integrally formed and made of elastic materials such as rubber.

The main tube portion 11 is tapered to a top aperture 11a thereof and an inner surface 11b is integrally provided with a plurality of supporting ribs 11c. The inserted wiring harness 7 is supported and fastened by the supporting ribs 11c. An outer surface of the main tube portion 11 is further fastened by an adhesive tape T wound therearound. The outer surface of the main tube portion 11 is further provided with a tape stopper 11d so that the adhesive tape T is prevented from displacing.

The thin-walled portion 15c is annularly formed on the base body 15 so that the flange 19 can elastically deform in a direction thereto. Thereby the whole body is easily removed from a molding die (not shown).

Figure 2:
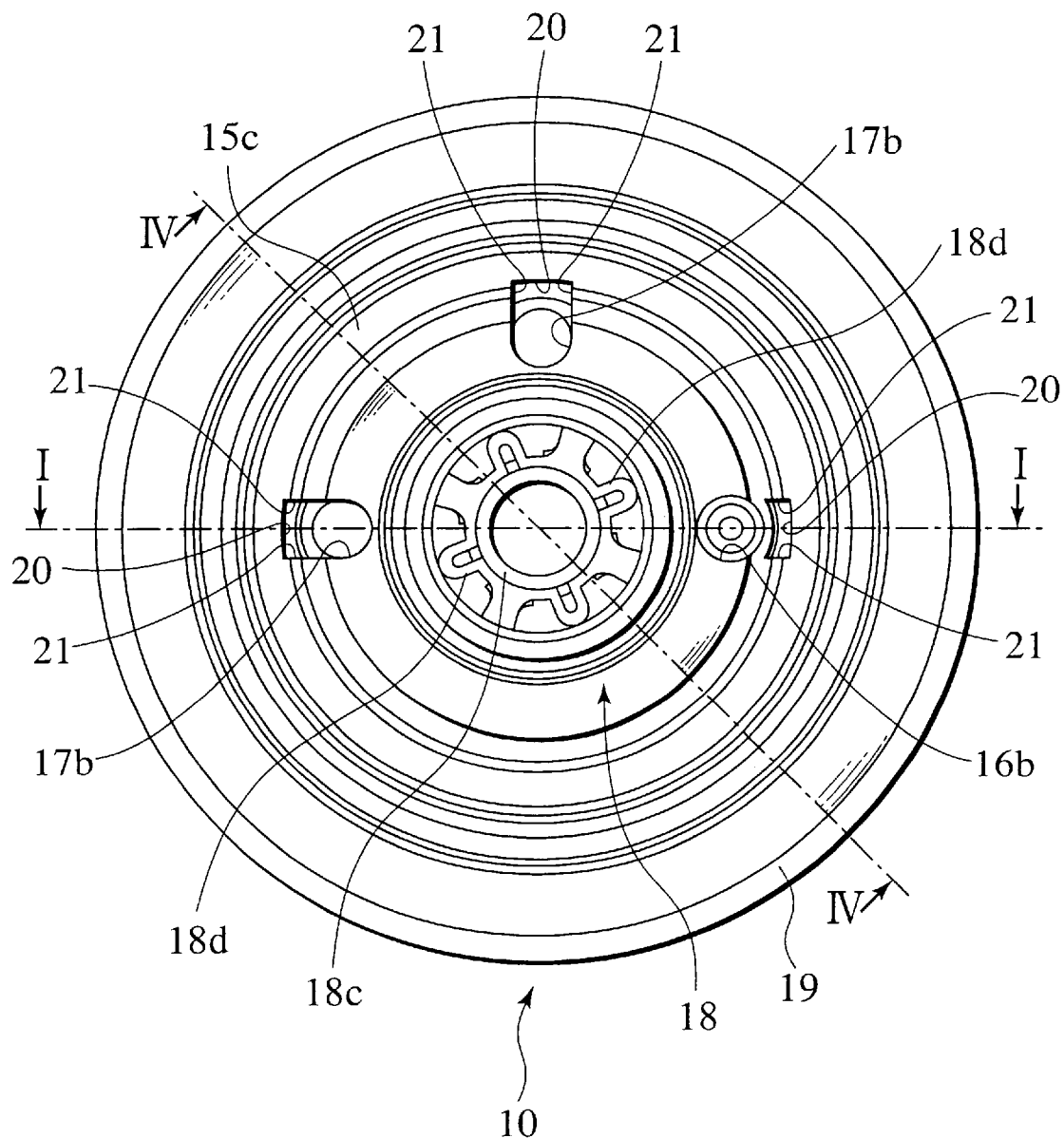
FIG. 2 is a bottom plan view of the soundproof grommet.
Figure 3:
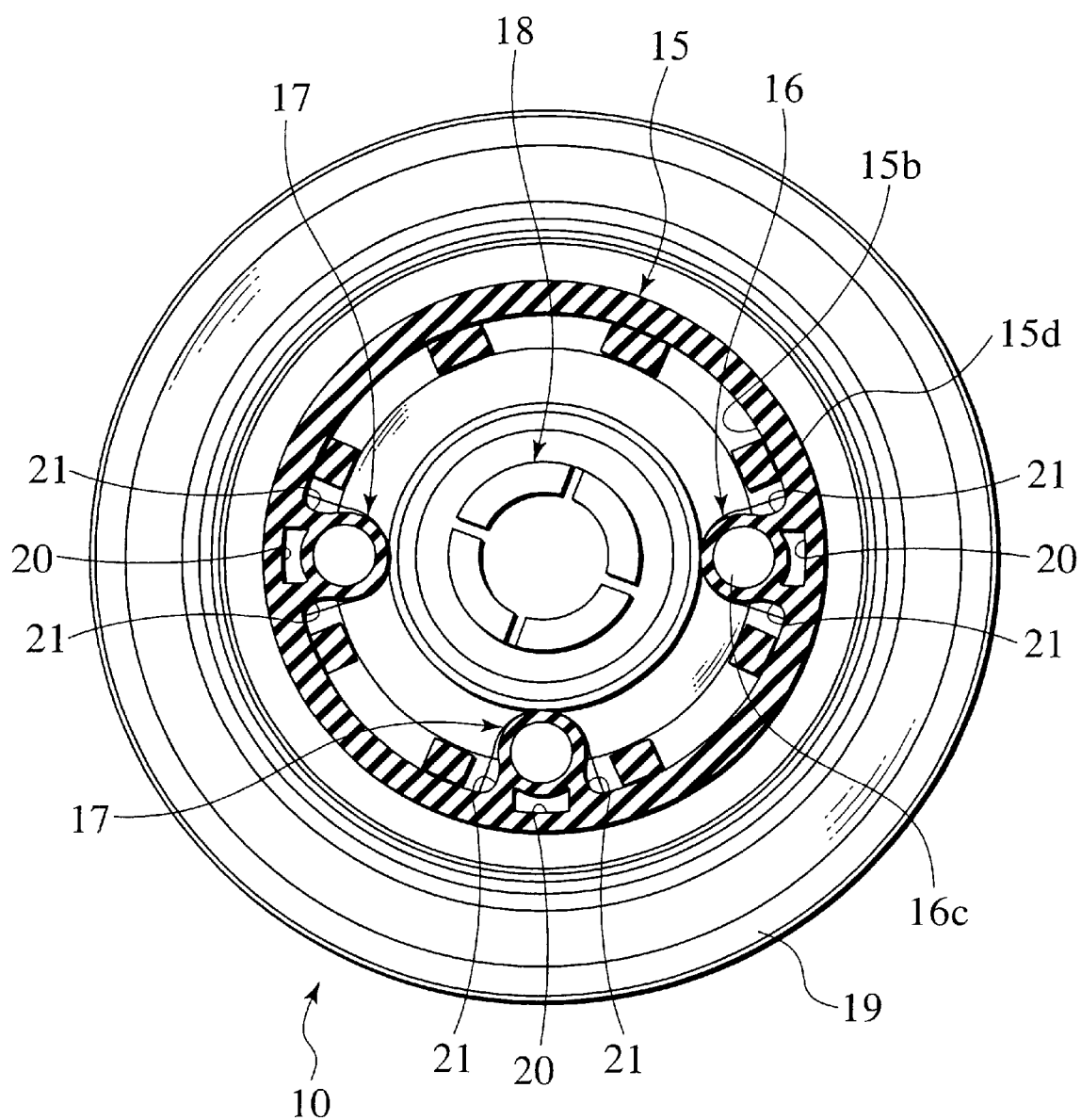
FIG. 3 is a sectional view of the soundproof grommet taken along a line III—III of FIG. 1.

The extra tube portions 16 and 17 are formed in a cylindrical shape and penetrate the conical wall 13 and the soundproof envelope 18 as shown in FIGS. 1–3. The first extra tube portion 16 is formed shorter than the second extra tube portion 17. The first extra tube portion 16 is integrally covered with a cap portion 16a, and when an extra cable needs to be inserted to the first extra tube portion 16, the cap portion 16a may be cut out or perforated. The second extra tube portion 17 is provided for supporting a thicker cable or tube such as a washer liquid tube or a fog lamp cable (not shown). The second extra tube portion 17 is also integrally covered with a cap portion 17a and may be cut out or perforated when in use.

The soundproof envelope 18 is provided with a bulge portion 18a, a turn-over portion 18b and a wire supporting portion 18c as shown in FIGS. 1 and 4. The bulge portion 18a is integrally connected with an inner periphery of a thin-walled portion 15c of the base body 15 and bulges downward. The bulge portion 18a is folded upward to form the turn-over portion 18b and is integrally connected with the wire supporting portion 18c. The wire supporting portion 18c is integrally provided with a plurality of pleats 18d which project outward so as to be in close contact with a wiring harness 7 inserted thereto, when an adhesive tape T is wound there around. Thereby a chamber Y formed between the base body 15 and the soundproof envelope 18 is kept airtight. Furthermore, the wire supporting portion 18c is integrally provided with a tape stopper 18e on an outer wall thereof.

A pair of soundproof walls 21 are provided between each of the extra tube portions 16,17 and the inner surface 15b of the base body 15 as shown FIG. 1–4. The soundproof walls 21 are integrally connected with the conical wall 13, the soundproof envelope 18 and the extra tube portions 16,17 so that the chamber Y is kept airtight. In a case where recesses 20 are respectively provided adjacent to the extra tube portions 16,17 so as to penetrate the base body 15 through the soundproof envelope 18, the soundproof walls 21 assure the airtightness of the chamber Y.

According to the soundproof grommet 10 described above, because the chamber Y is kept airtight after the wiring harness 7 is inserted to and in close contact with the main tube portion 10 and the wire supporting portion 18c, the airtight chamber Y insulates noise from outside or an engine room of the vehicle.

Furthermore, each of the extra tube portions 16 and 17 is further provided with pair of soundproof walls 21 integrally connected with the conical wall 13 and the soundproof envelope 18. In a case where recesses 20 penetrating the base body 15 through the soundproof envelope 18 are provided adjacent to the extra tube portions 16 and 17 respectively, the airtightness of the chamber Y is assured by the soundproof walls 21 instead of the penetrated base body 15. Thereby excellent sound insulation is assured.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A soundproof grommet comprising:

a base body including an engaging groove provided on an outer surface thereof, a conical wall integrally connected therewith and a main tube portion integrally projected from the conical wall;

a soundproof envelope integrally connected with the base body, having a wire supporting portion; and one or more extra tube portions penetrating the conical wall and the soundproof envelope in an integral manner;

wherein the main tube portion and the wire supporting portion receive and closely contact with a wiring harness inserted thereto so that the base body and the soundproof envelope form an airtight chamber.

2. The soundproof grommet according to claim 1, wherein:

each of the extra tube portions comprises a pair of soundproof walls integrally connected with the conical wall and the soundproof envelope.

* * * * *